Patented Jan. 18, 1949

2,459,439

UNITED STATES PATENT OFFICE 2,459,439

POLYMERIC MATERIALS FROM ISO- AND ISOTHIOCYANATES WITH ACRYLIC ACIDS

Joy G. Lichty, Stow, and Nelson V. Seeger, Cuyahoga Falls, Ohio, assignors to Wingfoot Corporation, Akron, Ohio, a corporation of Delaware No Drawing. Application September 16, 1943, Serial No. 502,634

7 Claims. (Cl. 260—79)

This invention relates to polymeric materials and a method for preparing them.

It is known that high molecular weight materials may be prepared by reacting a compound having a plurality of isocyanate or isothiocyanate radicals with a compound having a plurality of groups containing replaceable hydrogen, such as polyamino compounds, polyhydroxy compounds, aminohydroxy compounds, polycarboxylic compounds and the like. It has now been discovered that organic diisocyanates and diisothiocyanates may be reacted with an acrylic acid which contains only a single carboxyl group to produce high molecular weight polymeric materials.

Since the diisocyanate (or diisothiocyanate) has two equally reactive radicals while the acrylic acid has only one, the acrylic acid may react with either or both of the isocyanate (or isothiocyanate) radicals. Thus, the reaction will be influenced in part by the proportions of reactants, which will usually be employed in the ratio of about one to two mols of the acrylic acid to each mol of the diisocyanate (or diisothiocyanate) so as to avoid an undue excess of either reactant.

It appears that the acrylic acid and diisocyanate react to form an addition product. Thus, in some cases, when liquid reactants are mixed at room temperature, a solid forms. At somewhat higher temperatures, for example, at about 100° C. and higher, carbon dioxide is split out and polymerization takes place. It is reasonable to suppose that the final product is in the nature of a polyamide.

The temperature for the polymerization may be varied considerably. Satisfactory results are customarily obtained at a temperature of about 100–150° C. The polymerization proceeds without a catalyst but, if desired, an oxygen-providing polymerization catalyst such as benzoyl peroxide, acetyl peroxide, sodium peroxide, sodium perborate and tertiary butyl chromate may be used. Such catalysts, if used, are ordinarily employed in relatively small amount, for example, about 0.5–4%.

The practice of the invention is illustrated by the following examples:

Example 1

A mixture of 84.8 grams (1.18 mol) of acrylic acid and 99 grams (0.59 mol) of hexamethylene diisocyanate was heated gradually to 100° C. A large evolution of carbon dioxide took place, giving a very viscous liquid. After a short continued period of heating at 100° C. the liquid polymerized to produce, on cooling, an elastic, rubber-like material.

Example 2

Sixteen and four-tenths grams (0.1 mol) of hexamethylene diisocyanate and 8.6 grams (0.1 mol) of methacrylic acid were mixed, a solid product separating with little liberation of carbon dioxide. The temperature was raised to 150–180° C. for a period of 5–10 minutes. Here much carbon dioxide was evolved. Some solid still remained. The temperature was now increased to the melting point of the solid where more carbon dioxide was evolved. When no more carbon dioxide was evolved, the formation of the polyamide was complete. The product was cooled at this stage. The resulting product was a polymeric polyamide capable of forming fibers. If desired, the resin may be modified by continued heating with or without an oxygen-providing catalyst. This modification can be carried out at temperatures ranging from 60–200° C.

Example 3

Forty-nine grams (0.5 mol) of ethacrylic acid and 82 grams (0.5 mol) of hexamethylene diisocyanate were mixed, an exothermic reaction occurring. The viscous liquid was heated to 100° C. and carbon dioxode was evolved. It was then heated to 150–170° C., further polymerization occurring. On cooling, a clear, soft, elastic solid was obtained.

Any organic diisocyanate or diisothiocyanate, either aliphatic or aromatic, may be employed in the invention. Further representative examples are octamethylene diisocyanate, decamethylene diisocyanate, ethylene diisocyanate, trimethylene diisocyanate and other alkylene diisocyanates, oxy bis (trimethylene isocyanate), ethylene bis (trimethylene isocyanate), methylene bis (p-phenylene isocyanate), p,p'-diphenylene diisocyanate, the xylylene diisocyanates, ortho-, meta- and para-phenylene diisocyanates, etc. and the corresponding isothiocyanates.

Moreover, in addition to the parent acrylic acid, substituted acrylic acids containing various substituents which are inert in the reaction may be employed. Further examples are α-methacrylic acid, α-ethacrylic acid and other alpha-alkyl acrylic acids, α-phenyl acrylic acid, α-chloroacrylic acid, α-bromoacrylic acid, α-methoxyacrylic acid, α, β-dichloroacrylic acid, etc.

What we claim is:

1. A process of forming a solid rubbery polymeric material which comprises reacting from one to two mols of a monomer selected from the group consisting of acrylic acid, alpha methacrylic acid, alpha ethacrylic acid, alpha phenyl acrylic acid, alpha chloroacrylic acid, alpha bromoacrylic acid, alpha methoxyacrylic acid and alpha beta dichloroacrylic acid with one mol of a material selected from the group consisting of organic diisocyanates having as the sole functional constituents two isocyanate radicals and organic diisothiocyanates having as the sole functional constituents two isothiocyanate radicals at a temperature between 100°–150° C.

2. A process of forming a solid rubbery polymeric material which comprises reacting from one to two mols of acrylic acid with one mol of a material selected from the group consisting of organic diisocyanates having as the sole functional constituents two isocyanate radicals and organic diisothiocyanates having as the sole functional constituents two isothiocyanate radicals at a temperature between 100°–150° C.

3. A process of forming a solid rubbery polymeric material which comprises reacting from one to two mols of alpha methacrylic acid with one mol of a material selected from the group consisting of organic diisocyanates having as the sole functional constituents two isocyanate radicals and organic diisothiocyanates having as the sole functional constituents two isothiocyanate radicals at a temperature between 100°–150° C.

4. The process of forming a solid rubbery polymeric material which comprises reacting from one to two mols of a monomer selected from the group consisting of acrylic acid, alpha methacrylic acid, alpha ethacrylic acid, alpha phenyl acrylic acid, alpha chloroacrylic acid, alpha bromoacrylic acid, alpha methoxyacrylic acid and alpha beta dichloroacrylic acid with one mol of hexamethylene diisocyanate at a temperature between 100–150° C.

5. The process of forming a solid rubbery polymeric material which comprises reacting from one to two mols of acrylic acid with one mol of hexamethylene diisocyanate at a temperature between 100–150° C.

6. The process of forming a solid rubbery polymeric material which comprises reacting from one to two mols of methacrylic acid with one mol of hexamethylene diisocyanate at a temperature between 100–150° C.

7. The process of forming a solid rubbery polymeric material which comprises reacting from one to two mols of ethacrylic acid with one mol of hexamethylene diisocyanate at a temperature between 100–150° C.

JOY G. LICHTY.
NELSON V. SEEGER.

REFERENCES CITED

The following references are of record in the file of this patent:

UNITED STATES PATENTS

| Number | Name | Date |
|---|---|---|
| 2,284,896 | Hanford et al. | June 2, 1942 |